No. 740,829. PATENTED OCT. 6, 1903.
W. N. DUMARESQ.
VARIABLE SPEED GEARING.
APPLICATION FILED MAY 8, 1903.
NO MODEL. 2 SHEETS—SHEET 2.

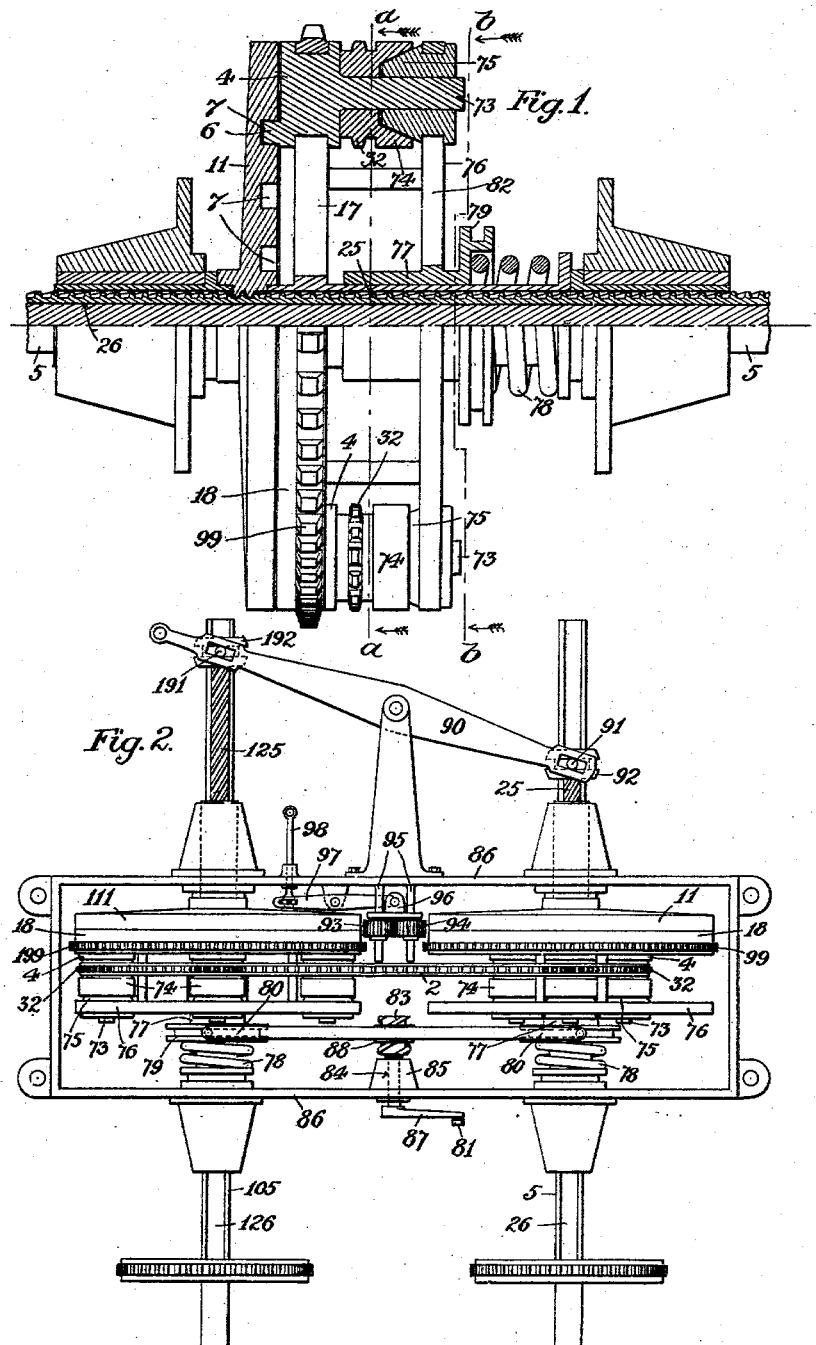

Witnesses:—
M. J. Dixon
N. S. Hall

Inventor:—
William N. Dumaresq.
by Henry H. Bates
Attorney.

No. 740,829. Patented October 6, 1903.

UNITED STATES PATENT OFFICE.

WILLIAM NEWTON DUMARESQ, OF ACTON, ENGLAND.

VARIABLE-SPEED GEARING.

SPECIFICATION forming part of Letters Patent No. 740,829, dated October 6, 1903.

Application filed May 8, 1903. Serial No. 156,256. (No model.)

*To all whom it may concern:*

Be it known that I, WILLIAM NEWTON DUMARESQ, a subject of the King of Great Britain, residing at 52 King Edward's Gardens, Acton, in the county of Middlesex, England, have invented new and useful Improvements in Variable-Speed Gearing, of which the following is a specification.

This invention relates to improvements in variable-speed gearing of the class described in the specifications of my prior patents, Nos. 724,449 and 724,450, both dated April 7, 1903, whereby the speed transmitted from the driving to the driven shaft can be varied at will while such shafts are running. This class of variable-speed gearing comprises a drum capable of expansion and contraction and composed of a series of bearings capable of sliding radially in grooves formed in a disk secured to the shaft on which it is mounted and each carrying a grooved pulley-wheel or sprocket-wheel, (according to whether cord or chain transmission is employed,) which is mounted on its axis so that it can either remain fixed or revolve in relation thereto. In the specifications of the patents above referred to this is effected by mounting the said pulleys or sprockets on their axes by means of a roller or other suitable clutch, which prevents them revolving on such axes in one direction, but allows them to do so in the opposite direction when the bearings are being expanded or contracted.

According to the present invention I substitute for the roller or other clutch, which allows of the rotation of the pulley-wheels or sprocket-wheels in one direction only, a friction-clutch, which will permit of their being left free to revolve in either direction when desired, but which will enable them to be locked, so as to become rigid on their axes when necessary, so that the whole of said pulleys or sprockets will simply rotate with the drum and the shaft of the latter. A suitable method of carrying this arrangement into effect is illustrated in the accompanying drawings, in which—

Figure 3:
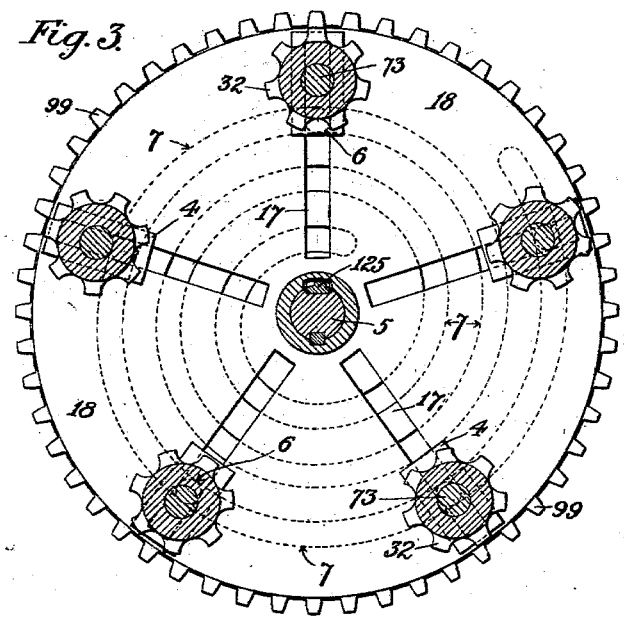
Figure 4:
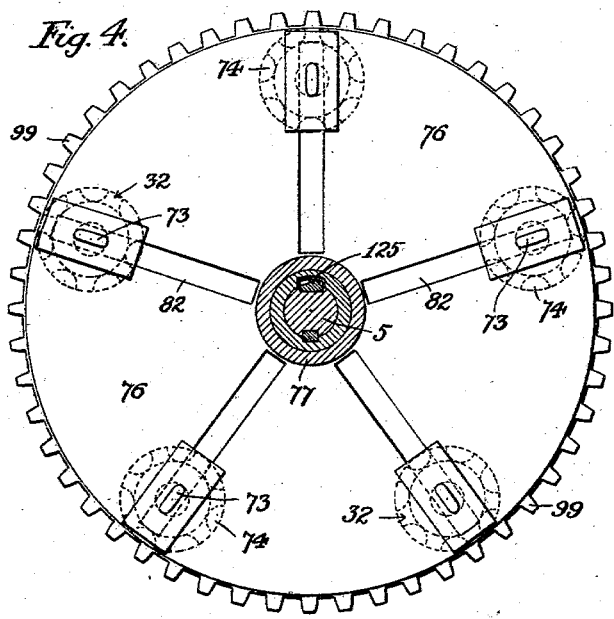

Figure 1 is a longitudinal view of one of the expanding drums, the lower half being in elevation and the upper half in section; and Fig. 2, a plan view of the driving and driven drums arranged in their casing and showing means for expanding and contracting same and also for reversing the direction of rotation of the driven shaft. Fig. 3 is a sectional view through one of the expanding drums on line *a a*, Fig. 1, looking in the direction of the arrows; and Fig. 4 is an end view thereof, partly in section, on line *b b*, Fig. 1, also looking in the direction of the arrows.

Referring to Fig. 1, 5 is either the driving or driven shaft, upon which is mounted the part 18, provided with radial grooves 17, in which the bearings 4 are capable of being moved outward and inward simultaneously, such bearings carrying spindles 73, upon which the sprocket-wheels 32 (or the grooved pulleys over which the cord or rope passes when rope transmission is employed) are mounted, so that they can revolve in either direction when free, such bearings also being provided with pins 6, engaging with the scroll-thread 7 plate 11, and which is capable of being rotated in either direction by means of the rack 25, capable of sliding longitudinally in a groove 26 in the shaft 5, said rack being provided with diagonal teeth engaging with similar diagonal channels formed in the hub of the scroll-thread plate 11, whereby the said scroll-thread plate is caused to rotate, as above stated, according to the direction in which said rack 25 is longitudinally moved.

It will be seen that each of the sprocket-wheels 32 (or the pulleys if same are employed) is provided with a conical recessed part 74, with which engages a corresponding cone 75, mounted on a disk 76, forming part of a sleeve 77, capable of being moved longitudinally in relation to the part 18 with the radial slots 17, in which the bearings 4 are capable of moving inward and outward. This disk 76 is normally forced toward the part 18, in which the bearings 4 are mounted, by means of a strong spring 78, whereby the cones 75, carried by the disk 76, are normally forced into the recess formed in the sprockets or pulleys, and the latter are thus held rigid in relation to their axes and only rotate with the part 18, in which the bearings carrying such axes are mounted. The sleeve 77, carrying the disk 76, is provided with a grooved part 79, with which engages a fork 80, connected to a pedal or lever 81 within reach of the operator of the machine to which the speed-gearing is applied, and by operating which pedal or lever the sleeve 77 is moved backward against the action of spring 78, and the friction-clutches formed by cones 75 and the seats in the sprockets 32 (or the pulleys) are consequently released, leaving the latter free to rotate on their axes in either direction as the bearings 4 carrying same are caused to expand or contract, according to the direction in which the scroll-plate 11 is caused to rotate.

It will be seen that the cones 75, carried by the disk 76, are mounted on the same axes as the sprockets or pulleys, which they serve to lock or release, and that such cones 75 are capable of moving radially in slots 82, formed in such disk, and thus follow the movement of said sprockets or pulleys as the drums expand or contract.

Referring now to Fig. 2, it will be seen that the means for actuating the friction-clutches of the sprockets 32 (or the pulleys) of the driving-shaft 105 and driven shaft 5 simultaneously consist of a screw-thread 83, mounted on a spindle 84, capable of turning in a bearing 85 in the casing 86 of the speed-gearing, on which spindle is mounted an arm 87, with which the actuating pedal or lever 81 is connected, and that such screw 83 works through a correspondingly-threaded boss 88, to which the forks 80, engaging the grooves 79 in the sleeves 77, are connected, so that by operating the pedal or lever 81 the two sleeves will be simultaneously moved in the direction for releasing the clutches 75.

The means shown for actuating the sliding racks 25 125, which cause the scroll-plates 11 111 to rotate in opposite directions, consist in a pivoted arm or lever 90, with slotted ends engaging pins 91 191 in collars 92 192, in which the driving and driven shafts are capable of revolving, respectively, but which are suitably connected to the racks 25 125, one arm of said lever 90 being controlled by a suitable lever, (not shown,) by operating which the collar 192 is caused to move the sliding rack 125 in one direction or the other, such movement being transmitted by the opposite arm of lever 90 to the other sliding rack 25, but in the opposite direction.

For the purpose of enabling the direction of rotation of the driven shaft 5 to be reversed two pinions 93 94 are mounted freely upon pins 95 and are carried by a collar 96, to which one arm of a pivoted lever 97 is connected, the other arm of such lever being connected to the reversing-lever through rod 98. A spur-wheel 199 is mounted on the part 18, in which the bearings 4, carrying the sprockets 32, (or the pulleys,) can slide, and a similar wheel 99 is mounted on the corresponding part 18 on the driven shaft 5, so that when the reversing-lever is actuated in the direction to bring the pinions 93 94, respectively, into gear with the spur-wheels 99 and 199 the motion of the driving-shaft 105 will be transmitted through the spur-wheel 199 and the pinions 93 94 to the spur-wheel 99, but in the reverse direction to that in which it would be transmitted through the sprockets 32 (or the pulleys) and the chain 2, it being of course understood that in this case the friction-clutches 75 of such sprockets or pulleys will have been moved, so as to leave such sprockets or pulleys free to rotate on their axes.

What I claim as my invention, and desire to secure by Letters Patent, is—

1. In variable-speed gear, a drum, radially-movable bearings in said drum, wheels pivotally mounted on said bearings, a flexible driving connection engaging said wheels, means for simultaneously moving said wheels radially inward or outward, means, as a friction-clutch, for locking each wheel against rotation in either direction or for permitting its free rotation in either direction, and means for simultaneously applying or releasing all of said locking and unlocking means at will, substantially as described.

2. In variable-speed gear, a driving-drum, a driven drum, radially-movable bearings in said drums, wheels pivotally mounted on said bearings, a flexible driving connection engaging said wheels, means for simultaneously moving said wheels radially inward or outward, means, as a friction-clutch, for locking each wheel against rotation in either direction or for permitting its free rotation in either direction, and means for simultaneously applying or releasing all of said locking and unlocking means at will, substantially as described.

3. In variable-speed gear, a driving-drum, a driven drum, radially-movable bearings in said drums, wheels pivotally mounted on said bearings, a flexible driving connection engaging said wheels, means for simultaneously moving said wheels radially inward or outward, means as a friction-clutch for locking each wheel against rotation in either direction or for permitting its free rotation in either direction, means for simultaneously applying or releasing said locking and unlocking means at will, and means for causing the rotation of said drums in opposite directions at will when said locking means are out of engagement, substantially as described.

In testimony whereof I have signed my name to this specification in the presence of two subscribing witnesses.

WILLIAM NEWTON DUMARESQ.

Witnesses:
CHAS. A. ALLISON,
HARRY A. McLELLAN.